(12) United States Patent
Chen et al.

(10) Patent No.: US 6,870,585 B2
(45) Date of Patent: Mar. 22, 2005

(54) TRANSFLECTIVE LIQUID CRYSTAL DISPLAY DEVICE HAVING VARIOUS CELL GAPS AND METHOD OF FABRICATING THE SAME

(75) Inventors: Chih-Chiang Chen, Ilan (TW); Jiun-Jye Chang, Kaohsiung (TW); Ching-Sang Chuang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 76 days.

(21) Appl. No.: 10/622,795

(22) Filed: Jul. 18, 2003

(65) Prior Publication Data
US 2004/0114077 A1 Jun. 17, 2004

(30) Foreign Application Priority Data
Dec. 17, 2002 (TW) .................................... 91136407 A (51) Int. Cl.⁷ ...................... G02F 1/1333; G02F 1/1335
(52) U.S. Cl. ...................... 349/106; 349/113; 345/88; 359/850
(58) Field of Search .................. 349/113, 106; 345/88; 359/850

(56) References Cited

U.S. PATENT DOCUMENTS

| 6,661,484 B1 | * | 12/2003 | Iwai et al. | 349/107 |
| 2001/0008437 A1 | * | 7/2001 | Fujimori et al. | 349/113 |
| 2002/0054256 A1 | * | 5/2002 | Kim et al. | 349/113 |

* cited by examiner

Primary Examiner—Huyen Ngo
(74) Attorney, Agent, or Firm—Quintero Law Office (57) ABSTRACT

A transflective LCD device having various cell gaps. The transflective LCD device is characterized by the passivation layer being formed on a lower substrate in a reflective region. A color filter layer is formed above the passivation layer, wherein a first thickness of the color filter layer in the reflective region is smaller than a second thickness of the color filter layer in a transmissive region. A transparent organic element is formed on an inner side of an upper substrate in the reflective region for bridging a gap in a liquid crystal layer between upper and lower substrates, wherein one end of the transparent organic element shores up the lower substrate. Thus, the gap thickness in the reflective region is smaller than that in the transmissive region.

12 Claims, 6 Drawing Sheets

FIG. 5

TRANSFLECTIVE LIQUID CRYSTAL DISPLAY DEVICE HAVING VARIOUS CELL GAPS AND METHOD OF FABRICATING THE SAME

BACKGROUND OF THE INVENTION

1. Field of the Invention

The present invention relates to a transflective liquid crystal display device, and more particularly, to a transflective liquid crystal display device having various cell gaps.

2. Description of the Related Art

Liquid crystal display (LCD) devices are widely used as displays in devices such as a portable televisions and notebook computers. Liquid crystal display devices are classified into two types. One is a transmissive type liquid crystal display device using a backlight as a light source, and another is the reflective type liquid crystal display device using an external light source, such as sunlight or an indoor lamp. It is difficult to decrease the weight, the volume, and the power consumption of the transmissive type LCD due to the power requirements of the backlight component. The reflective type LCD has the advantage of not requiring a backlight component, but it cannot operate without an external light source.

In order to overcome the drawbacks of these two types of LCDs, a transflective LCD device which can operate both as a reflective and transmissive type LCD is disclosed. The transflective LCD device has a reflective electrode on a pixel region, wherein the reflective electrode has a transmissive portion. Thus, the transflective LCD device has lower power consumption than the conventional transmissive type LCD device because a backlight component is not used when there is a bright ambient light. Further, in comparison with the reflective type LCD device, the transflective LCD device has the advantage of operating as a transmissive type LCD device using backlight when no bright ambient light is available.

Figure 1:
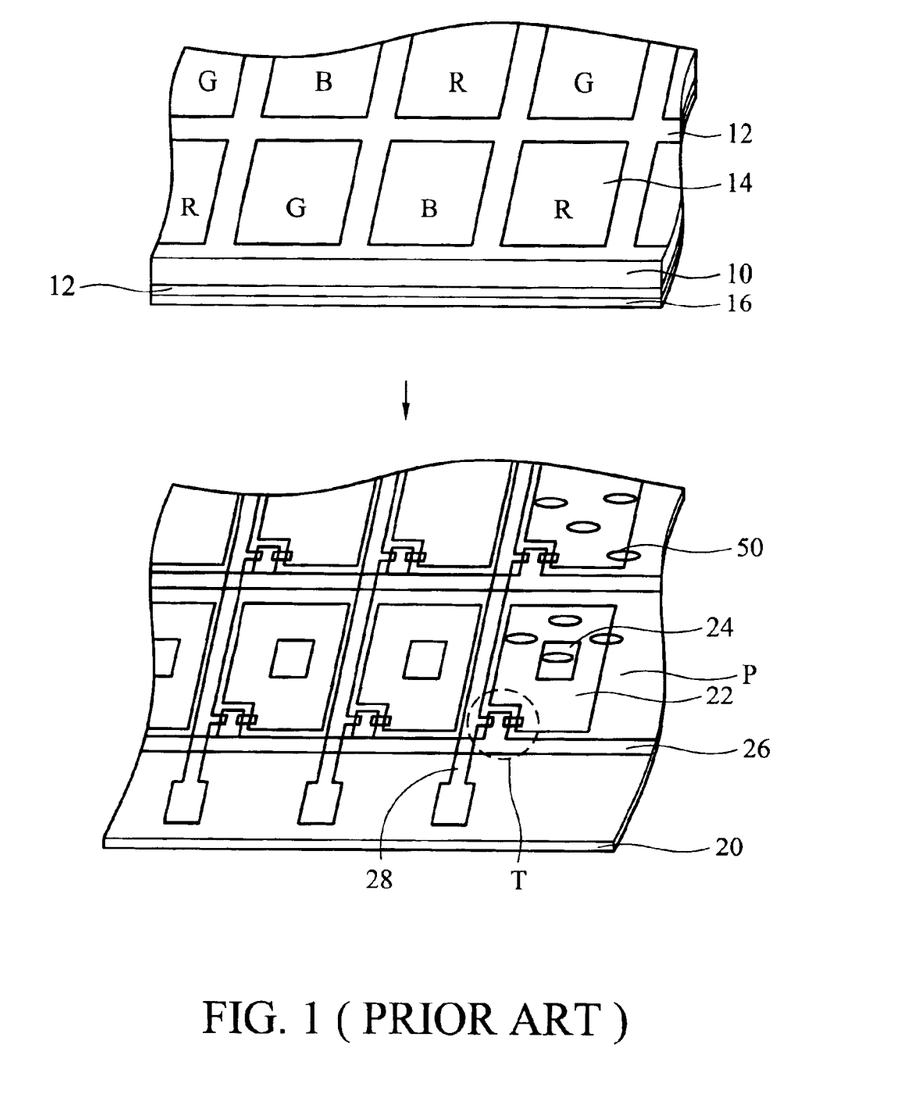
FIG. 1 is an exploded perspective view illustrating a typical transflective LCD device.

FIG. 1 is an explored perspective view illustrating a typical transflective LCD device. The transflective LCD device includes upper and lower substrates 10 and 20 that oppose each other, and a liquid crystal layer 50 is interposed therebetween. The upper substrate 10 is called a color filter substrate and the lower substrate 20 is called an array substrate. In the upper substrate 10, on a surface opposing the lower substrate 20, a black matrix 12 and a color filter layer 14 including a plurality of red (R), green (G) and blue (B) color filters are formed. That is, the black matrix 12 surrounds each color filter, in the shape of an array matrix. Further on the upper substrate 10, a common electrode 16 is formed to cover the color filter layer 14 and the black matrix 12.

In the lower substrate 20, on a surface opposing the upper substrate 20, a TFT "T" as a switching device is formed in shape of an array matrix corresponding to the color filter layer 14. In addition, a plurality of crossing gate and data lines 26 and 28 are positioned such that each TFT is located near the intersection of the gate and data lines 26 and 28. Further on the lower substrate, a plurality of pixel regions (P) are defined by the gate and data lines 26 and 28. Each pixel region P includes a reflective electrode 22 (reflective portion) and a transparent electrode 24 (transmissive portion). The reflective electrode 22 is made of a metal having a high reflectivity, and the transparent electrode 24 is made of a transparent conductive material, such as ITO (indium tin oxide) or IZO (indium zinc oxide).

Figure 2:
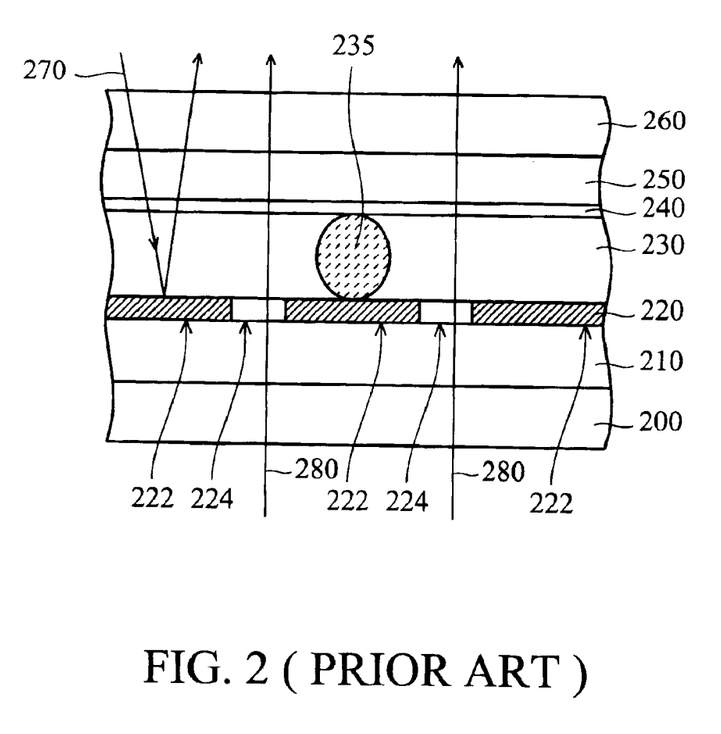
FIG. 2 is a sectional view of a transflective LCD device according to the prior art, illustrating the operation thereof.

FIG. 2, a sectional view of a traditional transflective LCD device, helps to illustrate the operation of such devices. As shown in FIG. 2, the conventional transflective LCD device includes a lower substrate 200, an upper substrate 260 and an interposed liquid crystal layer 230. The upper substrate 260 has a common electrode 240 and a color filter 250 thereon. The lower substrate 200 has an insulating layer 210 and a reflective electrode 220 thereon, wherein the reflective electrode 220 has an opaque portion 222 and a transparent portion 224. The opaque portion 222 of the reflective electrode 220 can be an aluminum layer, and the transparent portion 224 of the reflective electrode 220 can bean ITO (indium tin oxide) layer. The opaque portion 222 reflects the ambient light 270, while the transparent portion 224 transmits light 280 from the backlight device (not shown). The liquid crystal layer 230 includes a plurality of spherical spacers 235 used to keep a fixed layer thickness or cell gap of the liquid crystal layer 230. Thus, the transflective LCD device is operable in both reflective and transmissive modes.

The traditional transflective LCD device, however, has the problem of different color reproduction levels (color purity) in reflective and transmissive modes, due to, referring to FIG. 2, the backlight 280 penetrating the transparent portion 224 passing through the color filter 250 once and the ambient light 270 reflected from the opaque portion 222 passing through the color filter 250 twice. This greatly degrades the display quality of transflective LCDs.

U.S. Publication No. 2002/0003596A1 discloses a method of forming color filters having various thicknesses on the upper substrate, for solving the color purity issue. However, this conventional method requires additional fabrication steps to produce the color filters. Also, it is difficult to align the color filters with the lower substrate.

SUMMARY OF THE INVENTION

The object of the present invention is to provide a transflective liquid crystal display device.

Another object of the present invention is to provide a transflective liquid crystal display device with the same color purity in both transmissive and reflective modes.

Yet another object of the present invention is to provide a method of forming an integrated color filter (ICF) having various thicknesses on an array substrate, and forming a transparent organic element on an upper substrate to produce a transflective liquid crystal display device with various LC (liquid crystal) layer thicknesses or cell gaps, thereby improving color purity and light efficiency.

In order to achieve these objects, the present invention provides a transflective liquid crystal display device having various cell gaps and a method of fabricating the same. A first substrate serving as a lower substrate having a transmissive region and a reflective region thereon is provided. An array of pixel driving elements is formed on the first substrate in the reflective region. An insulating layer is formed on the first substrate to cover the array of pixel driving elements. A conformal transparent electrode is formed on the insulating layer, wherein the transparent electrode electrically connects the array of pixel driving elements. A passivation layer is formed on the insulating layer in the reflective region, wherein a top surface of the passivation layer is higher than a top surface of the insulating layer. A conformal reflective electrode is formed on the passivation layer, wherein the reflective electrode electrically connects the array of pixel driving elements. A color filter layer is formed on the reflective electrode and the transparent electrode, wherein a first thickness of the color filter layer in the reflective region is smaller than a second thickness of the color filter layer in the transmissive region. A second substrate serving as an upper substrate opposite the first substrate is provided. A common electrode is formed on an inner side of the second substrate. A transparent organic element is formed on the common electrode in the reflective region for bridging a gap in a liquid crystal layer between the first substrate and the second substrate, wherein one end of the transparent organic element shores up the color filter layer, and thus a third thickness of the gap in the reflective region is smaller than a fourth thickness of the gap in the transmissive region. The liquid crystal layer is interposed between the first substrate and the second substrate.

The present invention improves on the prior art in that the passivation layer is formed on the lower substrate in the reflective region. The color filter layer is formed above the passivation layer, wherein the first thickness of the color filter layer in the reflective region is smaller than the second thickness of the color filter layer in the transmissive region, thereby normalizing color reproduction (color purity) between reflective and transmissive modes of the transflective LCD.

In addition, according to the present invention, the transparent organic element is formed on the inner side of the upper substrate in the reflective region for bridging the gap in the liquid crystal layer between upper and lower substrates, wherein one end of the transparent organic element shores up the lower substrate. Thus, the third thickness of the gap in the reflective region is smaller than the fourth thickness of the gap in the transmissive region, thereby improving light efficiency of the transflective LCD.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

FIGS. 3A~3D, 4A~4B and 5 are sectional views illustrating a transflective LCD device having various cell gaps according to the present invention. In order to simplify the illustration, these figures show a partially sectional view in one pixel region. That is, the number of pixel regions may be very large.

Figure 3A:
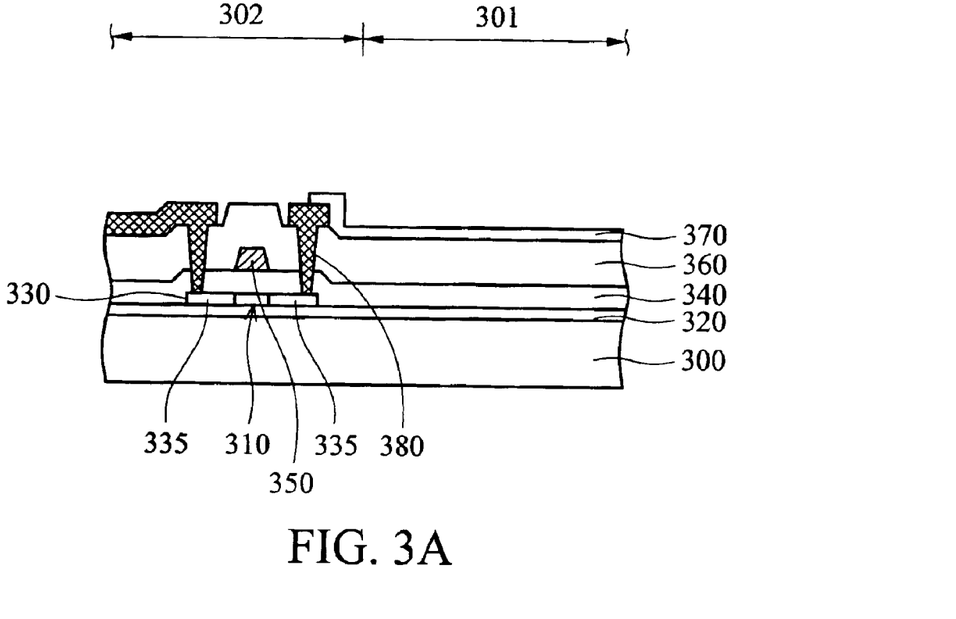
FIGS. 3A~3D are sectional views according to the present invention, showing the manufacturing steps of a lower substrate.

In FIG. 3A, a first substrate 300, serving as a lower substrate, having a predetermined transmissive region (or section) 301 and a predetermined reflective region (or section) 302 thereon is provided. The first substrate 300 can be a heat-resistant glass substrate, such as quartz.

In FIG. 3A, an array of pixel driving elements 310, such as an array of thin film transistors (TFTs), is formed on the first substrate 300 in the reflective region 302. A demonstrative method for forming the thin film transistor (TFT) 310 follows, but is not intended to limit the present invention. A buffer layer 320, such as $SiO_2$, is formed on the first substrate 300. A semiconductor island 330, such as silicon or polysilicon, is formed on part of the buffer layer 320. A gate insulating layer 340, such as $SiO_2$, is formed on the buffer layer 320 to cover the semiconductor island 330. Then, a gate 350, such as doped polysilicon or metal, is formed on part of the gate insulating layer 340. Using the gate 350 as a mask, an ion implantation is then performed to form source/drain regions 335 in the semiconductor island 330. Thus, the array of TFTs 310 is formed on the first substrate 300.

In FIG. 3A, an interlayer insulating layer 360, such as $SiO_2$, SiN and SiON, is formed above the first substrate 300 to cover the array of pixel driving elements 310. By performing deposition and etching, a conformal transparent electrode 370, such as ITO (indium tin oxide) or IZO (indium zinc oxide), is then formed on the interlayer insulating layer 360 in the transmissive region 301. Moreover, the transparent electrode 370 electrically connects the array of pixel driving elements 310 by means of a conductor 380 (also called an electrode).

Figure 3B:
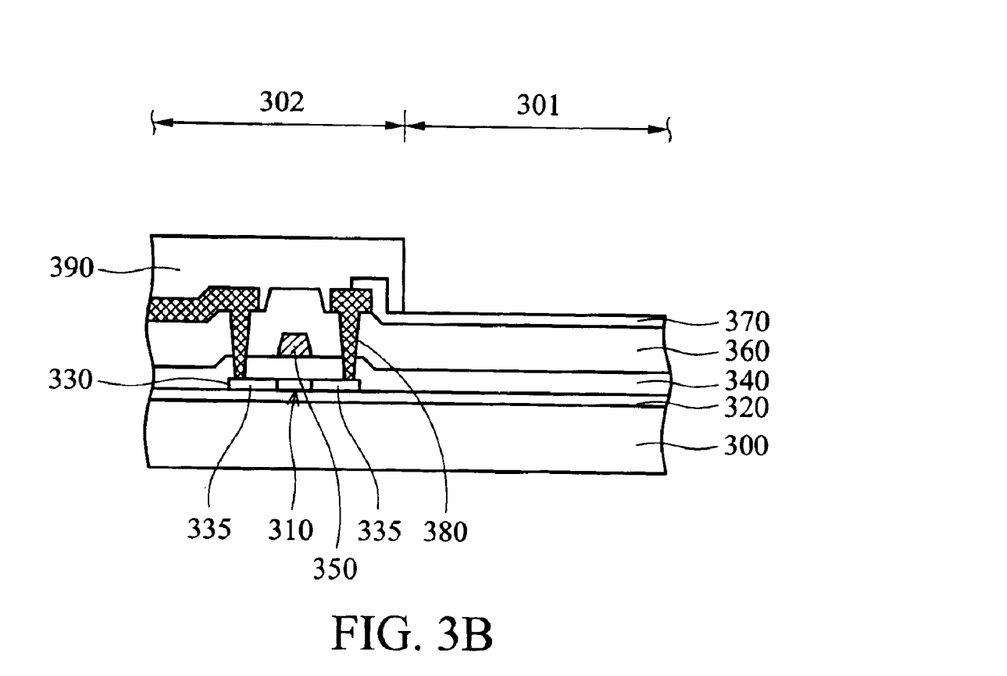

In FIG. 3B, by performing deposition and etching, a passivation layer 390, such as SOG (spin on glass), is formed on the interlayer insulating layer 360 in the reflective region 302, wherein a top surface of the passivation layer 390 is higher than a top surface of the interlayer insulating layer 360. That is, there is a height drop between the interlayer insulating layer 360 and the passivation layer 390.

Figure 3C:
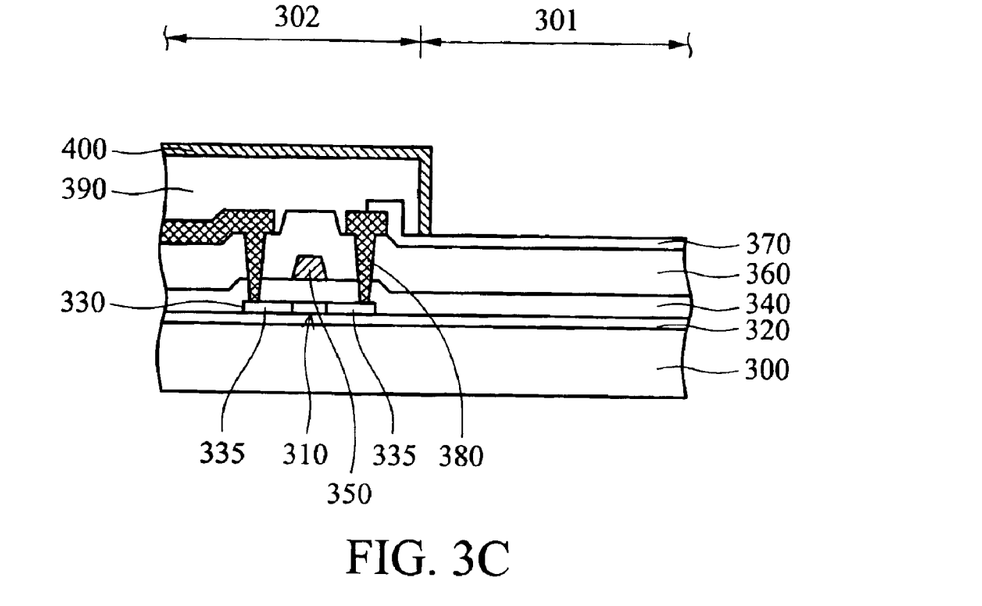

In FIG. 3C, a conformal reflective electrode 400, such as Al or Ag, is formed on the passivation layer 390. The reflective electrode 400 electrically connects the array of pixel driving elements 310 by connecting, for example, the transparent electrode 370.

Figure 3D:
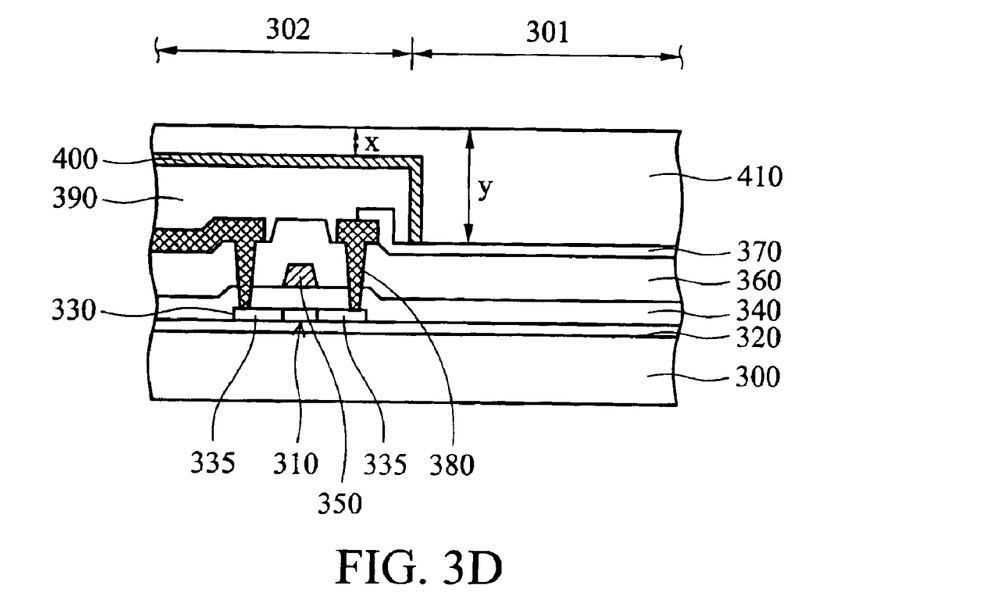

In FIG. 3D, a color filter layer 410 is formed on the reflective electrode 400 and the transparent electrode 370 by, for example, a pigment dispersion method, an inkjet method or others. The color filter layer 410 may have three color regions, such as red (R), green (G) and blue (B). It should be noted that a first thickness "x" of the color filter layer 410 in the reflective region 302 is smaller than a second thickness "y" of the color filter layer 410 in the transmissive region 301. The ratio of the first thickness "x" to the second thickness "y" can be suitably adjusted by controlling the thickness of the passivation layer 390.

Figure 4A:
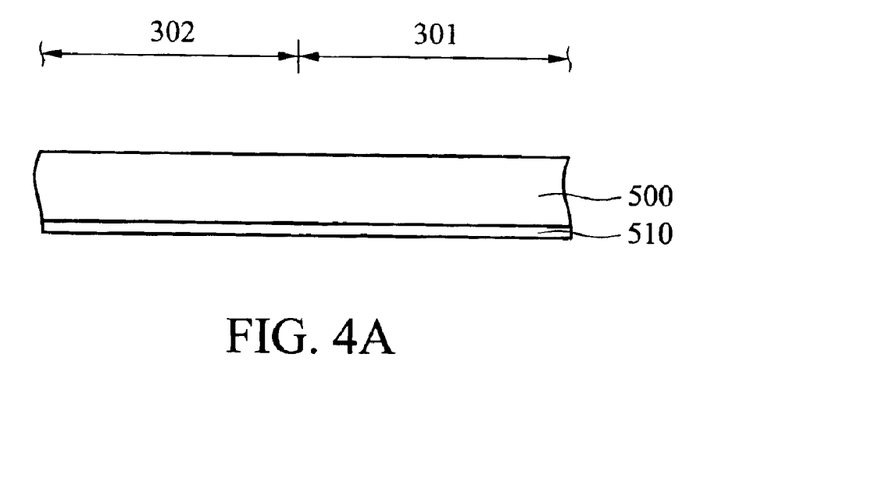
FIGS. 4A~4B are sectional views according to the present invention, showing the manufacturing steps of an upper substrate.

In FIG. 4A, a second substrate 500, such as glass, opposite the first substrate 300 is provided. Then, a common electrode 510 is formed on an inner side of the second substrate 500. The common electrode 510 may be an ITO or IZO layer.

Figure 4B:
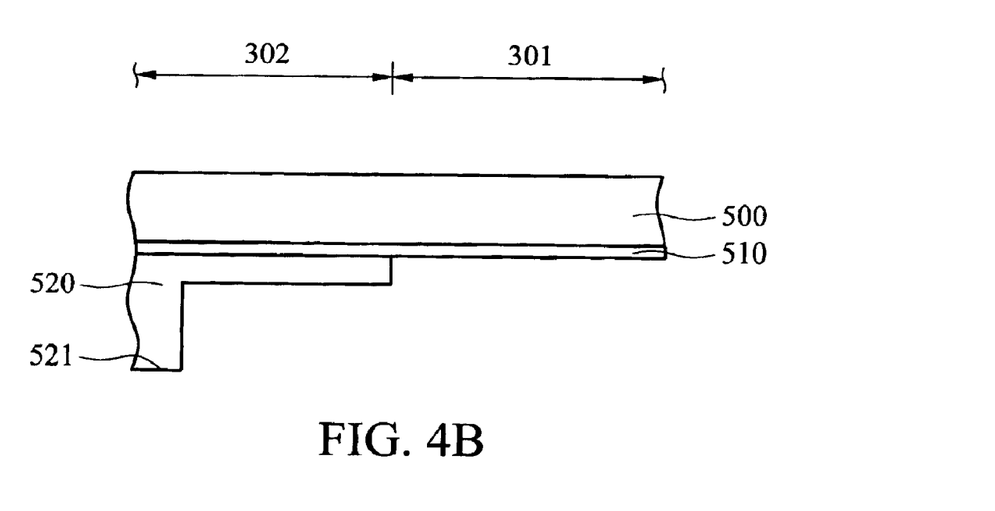
Figure 5:
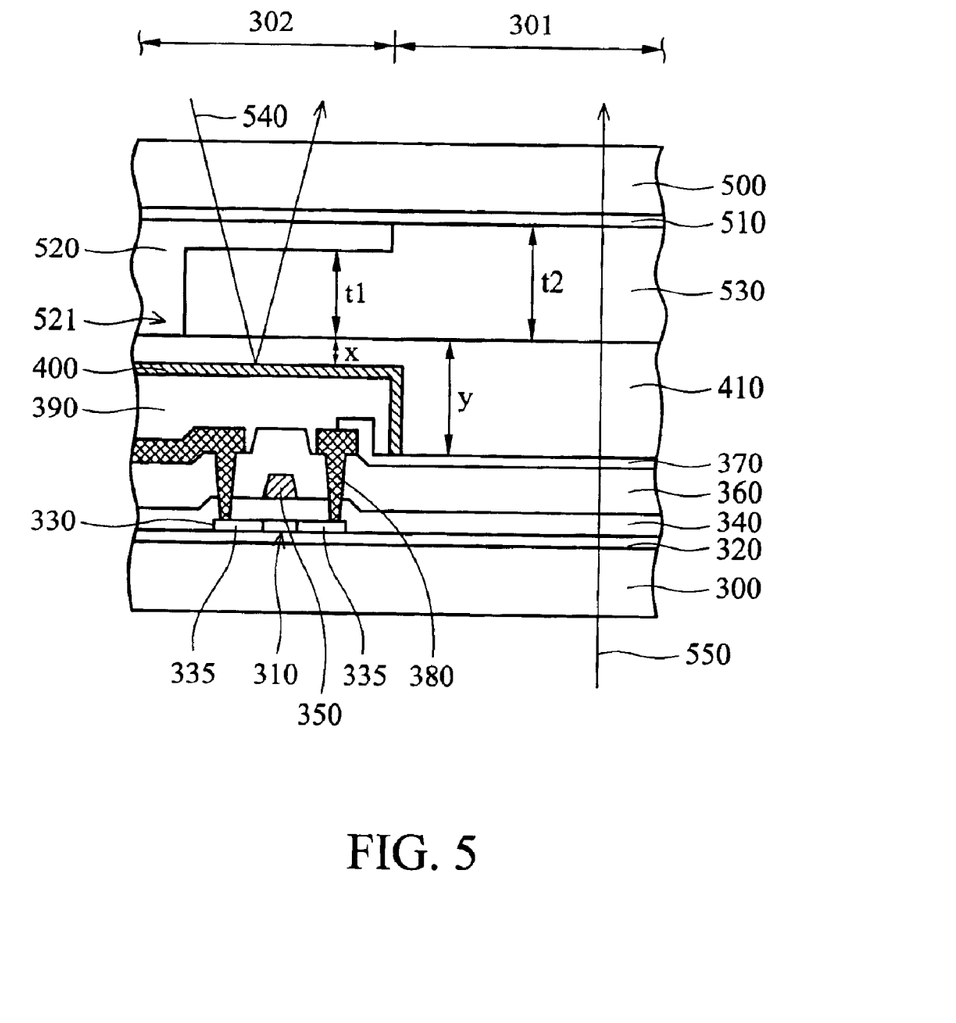
FIG. 5 is a sectional view of a transflective LCD device according to the present invention.

In FIG. 4B, a transparent organic element 520, for bridging a gap in a liquid crystal layer 530 (shown in FIG. 5) between the first substrate 300 and the second substrate 500, is formed on the common electrode 510 in the reflective region 302 by, for example, a patterning process, rolling method or printing method. One end, 521, of the transparent organic element 520 shores up the color filter layer 410, as shown in FIG. 5. The transparent organic element 520 can replace the conventional spherical spacer 235 shown in FIG. 2. The material of the transparent organic element 520 can be photosensitive organic resist. The profile of the transparent organic element 520 is, for example, angled-shape or "T" shape.

In FIG. 5, liquid crystal molecules fill a space between the first substrate 300 and the second substrate 500 to form the liquid crystal layer 530. Since transparent organic element 520 is located between the common electrode 510 and the color filter layer 410 in the reflective region 302, referring to FIG. 5, a third thickness "t1" of the gap in the reflective region 302 is smaller than a fourth thickness "t2" of the gap in the transmissive region 301.

As shown in FIG. 5, for a reflective mode of the transflective LCD device of the present invention, an ambient light 540 from an exterior light source (not shown) twice passes through the color filter layer 410 having the first thickness "x" in the reflective region 302. For a transmissive mode of the transflective LCD device of the present invention, a backlight 550 from a backlight source (not shown) once passes through the color filter layer 410 having the second thickness "y" in the transmissive region 301. Since the first thickness "x" is smaller than the second thickness "y" (for example, x/y=½), the total passage of the ambient light 540 passing through the color filter layer 410 is similar to that of the backlight 550, thereby normalizing color reproduction (color purity) between reflective and transmissive modes of the transflective LCD.

In addition, for a reflective mode of the transflective LCD device of the present invention, the ambient light 540 passes through the liquid crystal layer 530 having the third thickness "t1" in the reflective region 302 twice. For a transmissive mode of the transflective LCD device of the present invention, the backlight 550 passes through the liquid crystal layer 530 having the fourth thickness "t2" in the transmissive region 301 once. Since the third thickness "t1" is smaller than the fourth thickness "t2" (for example, t1/t2=½), the total passage of the ambient light 540 passing through the liquid crystal layer 530 is similar to that of the backlight 550, thereby enhancing light efficiency in reflective and transmissive modes of the transflective LCD.

Thus, the present invention provides a novel transflective liquid crystal display device having various cell gaps. The color filter layer 410 having various thicknesses (x and y) is formed on the lower substrate 300 (also called the array substrate), and the transparent organic element 520 is formed on the upper substrate 500 to make the liquid crystal layer 410 has various cell gaps (t1 and t2), thereby improving color purity and light efficiency.

Finally, while the invention has been described by way of example and in terms of the above, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A transflective liquid crystal display device having various cell gaps, comprising:
    a first substrate having a transmissive region and a reflective region thereon;
    an array of pixel driving elements formed on the first substrate in the reflective region;
    an insulating layer formed on the first substrate to cover the array of pixel driving elements;
    a passivation layer formed on the insulating layer in the reflective region, wherein a top surface of the passivation layer is higher than a top surface of the insulating layer;
    a conformal reflective electrode formed on the passivation layer, wherein the reflective electrode electrically connects the array of pixel driving elements;
    a conformal transparent electrode formed on the insulating layer, wherein the transparent electrode electrically connects the array of pixel driving elements;
    a color filter layer formed on the reflective electrode and the transparent electrode, wherein a first thickness of the color filter layer in the reflective region is smaller than a second thickness of the color filter layer in the transmissive region;
    a second substrate opposite the first substrate;
    a common electrode formed on an inner side of the second substrate;
    a liquid crystal layer interposed between the first substrate and the second substrate; and
    a transparent organic element bridging a gap in the liquid crystal layer between the first substrate and the second substrate, formed on the common electrode in the reflective region, wherein one end of the transparent organic element shores up the color filter layer, thus a third thickness of the gap in the reflective region is smaller than a fourth thickness of the gap in the transmissive region.

2. The transflective LCD device according to claim 1, wherein the array of the pixel driving elements is an array of thin film transistors (TFTs).

3. The transflective LCD device according to claim 1, wherein the transparent electrode is an ITO (indium tin oxide) layer or an IZO (indium zinc oxide) layer.

4. The transflective LCD device according to claim 1, wherein the reflective electrode is an aluminum layer or a silver layer.

5. The transflective LCD device according to claim 1, wherein the common electrode is an ITO (indium tin oxide) layer or an IZO (indium zinc oxide) layer.

6. The transflective LCD device according to claim 1, wherein the transparent organic element has an angular shape.

7. A method of fabricating a transflective liquid crystal display device having various cell gaps, comprising the steps of:
    providing a first substrate having a transmissive region and a reflective region thereon;
    forming an array of pixel driving elements on the first substrate in the reflective region;
    forming an insulating layer on the first substrate to cover the array of pixel driving elements;
    forming a conformal transparent electrode on the insulating layer, wherein the transparent electrode electrically connects the array of pixel driving elements;
    forming a passivation layer on the insulating layer in the reflective region, wherein a top surface of the passivation layer is higher than a top surface of the insulating layer;
    forming a conformal reflective electrode on the passivation layer, wherein the reflective electrode electrically connects the array of pixel driving elements;
    forming a color filter layer on the reflective electrode and the transparent electrode, wherein a first thickness of the color filter layer in the reflective region is smaller than a second thickness of the color filter layer in the transmissive region;
    providing a second substrate opposite the first substrate;
    forming a common electrode on an inner side of the second substrate;
    forming a transparent organic element on the common electrode in the reflective region for bridging a gap in a liquid crystal layer between the first substrate and the second substrate, wherein one end of the transparent organic element shores up the color filter layer, thus a third thickness of the gap in the reflective region is smaller than a fourth thickness of the gap in the transmissive region; and filling a space between the first substrate and the second substrate with liquid crystal molecules to form the liquid crystal layer.

8. The method according to claim 7, wherein the array of the pixel driving elements is an array of thin film transistors (TFTs).

9. The method according to claim 7, wherein the transparent electrode is an ITO (indium tin oxide) layer or an IZO (indium zinc oxide) layer.

10. The method according to claim 7, wherein the reflective electrode is an aluminum layer or a silver layer.

11. The method according to claim 7, wherein the common electrode is an ITO (indium tin oxide) layer or an IZO (indium zinc oxide) layer.

12. The method according to claim 7, wherein the transparent organic element has an angular shape.

* * * * *